United States Patent [19]

Berke et al.

[11] Patent Number: 5,527,388
[45] Date of Patent: *Jun. 18, 1996

[54] CORROSION INHIBITING FORMULATIONS WITH CALCIUM NITRITE

[75] Inventors: Neal S. Berke, Chelmsford; Ding F. Shen, Lexington; Maria C. Hicks, Newton, all of Mass.; Ellis M. Gartner, Silver Spring, Md.

[73] Assignee: W. R. Grace & Co.-Conn., New York, N.Y.

[*] Notice: The term of this patent shall not extend beyond the expiration date of Pat. No. 5,422,141.

[21] Appl. No.: 378,163

[22] Filed: Jan. 25, 1995

[51] Int. Cl.⁶ .......................... C04B 14/00; C04B 22/00; C04B 24/00
[52] U.S. Cl. .................. 106/819; 106/724; 106/728; 106/802; 106/810
[58] Field of Search ................. 106/14.05, 14.12, 106/14.13, 14.14, 14.21, 14.41, 14.44, 728, 819, 724, 802, 810

[56] References Cited

U.S. PATENT DOCUMENTS

| | | | |
|---|---|---|---|
| 3,427,175 | 2/1969 | Angstadt et al. | 106/89 |
| 4,026,723 | 5/1977 | Graf et al. | 106/315 |
| 4,092,109 | 5/1978 | Rosenberg et al. | 21/2.5 |
| 4,285,733 | 8/1981 | Rosenberg et al. | 106/98 |
| 4,398,959 | 8/1983 | Rosenberg et al. | 106/90 |
| 4,442,021 | 4/1984 | Burge et al. | 252/389 |
| 4,466,834 | 8/1984 | Dodson et al. | 106/89 |
| 4,605,572 | 8/1986 | Omato et al. | 427/403 |
| 4,609,573 | 9/1986 | Omata et al. | 427/403 |
| 5,039,556 | 8/1991 | Cogliano et al. | 427/136 |
| 5,338,347 | 8/1994 | Rohr et al. | 106/14.43 |
| 5,422,141 | 6/1995 | Hoopes et al. | 106/14.13 |

FOREIGN PATENT DOCUMENTS

| | | |
|---|---|---|
| 468883 | 1/1992 | European Pat. Off. . |
| 635463 | 1/1995 | European Pat. Off. . |
| 2600563 | 7/1977 | Germany . |
| 3636659 | 4/1987 | Germany . |
| 50-016719 | 2/1975 | Japan . |
| 1257112 | 10/1989 | Japan . |
| 01298185 | 12/1989 | Japan . |
| 0437672 | 2/1992 | Japan . |

OTHER PUBLICATIONS

Cady, D.; Weyers, R. E.; Wilson, D. T; "Durability and Compatibility of Overlays and Bridge Deck Substrate Treatments"; Concrete International, Jun. 1994; pp. 36–44.

Manson, J. A.; Slutter, R. G.; Vanderhoff, J. W.; Weyers. R. E.; Cady, P. D.; Kline, D. E.; Moore, G. R.; Wilson, D. T.; Wong, K. H.; "Long–Term Rehabilitation of Salt–Contaminated Bridge Decks"; National Cooperative Highway Research Program Report 257; Apr. 1983.

Primary Examiner—Anthony Green
Attorney, Agent, or Firm—Craig K. Leon; William L. Baker; Nicholas P. Triano, III

[57] ABSTRACT

An admixture for cement compositions is provided which contributes both anodic and cathodic corrosion inhibition, and the cement compositions containing such additives. The cement additive is a combination of an anodic corrosion inhibitor such as calcium nitrite, and a cathodic corrosion inhibitor such as calcium stearate or other fatty acid. The mixed inhibitors in accordance with the invention provide as good or better corrosion inhibition than does calcium nitrite when used alone.

8 Claims, 1 Drawing Sheet

5,527,388

CORROSION INHIBITING FORMULATIONS WITH CALCIUM NITRITE

BACKGROUND OF THE INVENTION

The present invention relates to additives for cement compositions for the purpose of inhibiting corrosion, and to cement compositions containing such additives.

Alkali and alkaline earth metal nitrites are well known as corrosion inhibiting hydraulic cement additives for protecting steel embedded in cement compositions. Calcium nitrite in particular is a well known anodic corrosion inhibitor and is widely used in concrete for preventing corrosion of the steel reinforcing. For example, U.S. Pat. No. 3,427,175 discloses the addition of about 0.1 to 10 percent calcium nitrite to Portland cement as an accelerator and as a corrosion inhibitor. Similarly, U.S. Pat. No. 4,466,834 discloses the addition to Portland cement of stable, single phase aqueous solutions consisting essentially of water and, as solutes, a major amount by weight of calcium nitrite and a minor amount by weight of corn syrup, a hydroxycarboxylic acid, or an alkali metal or alkaline earth metal salt of hydroxycarboxylic acid. The addition of such aqueous solutions to the cement provides the corrosion inhibition of calcium nitrite without the corresponding set acceleration.

While other nitrites such as sodium nitrite can be used to inhibit corrosion, calcium nitrite is preferred inasmuch as it provides effective corrosion inhibition without many of the disadvantages encountered with other nitrites, such as reduction s in compressive strength or efflorescence on brick work.

Calcium nitrite anodic corrosion inhibitors rely on the formation of a passive film on the metal surface for corrosion protection. Cathodic inhibitors are another type of inhibitor which, in a high pH environment, inhibit the cathodic reaction which accompanies the anodic dissolution of the metal. In view of the specific properties that anodic and cathodic inhibitors each provide, it would be highly desirable to obtain both anodic and cathodic inhibition in cement compositions.

It is therefore an object of the present invention to combine the effects of anodic and cathodic corrosion inhibition in cement compositions to achieve the benefits of each.

SUMMARY OF THE INVENTION

The problems of the prior art have been overcome by the present invention, which provides an admixture for cement compositions which contributes both anodic and cathodic corrosion inhibition. The present invention also relates to the cement compositions containing such admixtures. More particularly, the present invention provides chemical additives to the anodic corrosion inhibitors alkali or alkaline earth metal nitrites, most preferably calcium nitrite, wherein said chemical additives act as cathodic corrosion inhibitors, thereby rendering the final product a mixed anodic-cathodic corrosion inhibitor. The mixed inhibitors of the invention provide as good or better corrosion inhibition than does calcium nitrite when it is used alone. Furthermore, the cathodic corrosion inhibitors surprisingly enhance the anodic corrosion protection provided by the calcium nitrite.

DETAILED DESCRIPTION OF THE INVENTION

Figure 1:
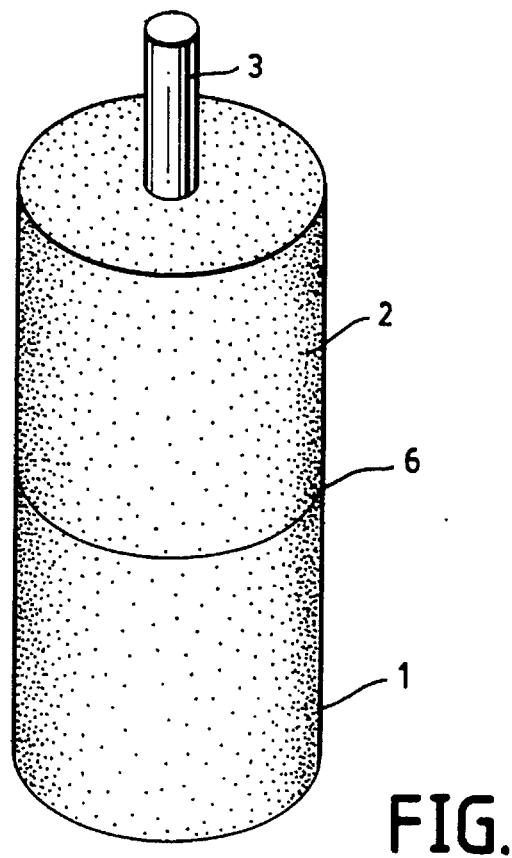
FIG. 1 is a diagram of a concrete 'lollipop' used to test corrosion resistance of concrete prepared in accordance with the present invention.

The present invention relates to admixture for hydraulic cement compositions that provides both anodic and cathodic corrosion inhibition, and to cement compositions containing such admixtures. In accordance therewith, we have found that when certain chemical additives are combined with alkali metal (Group Ia elements) nitrite or alkaline earth (Group IIa elements) nitrites, such as calcium nitrite; potassium nitrite and sodium nitrite; most preferably calcium nitrite, corrosion inhibition over time is as good or better than when the alkali metal or alkaline earth metal nitrite is added to the hydraulic cement composition alone.

The cement components in the cement compositions of the present invention are hydraulic cements. The term "hydraulic cements" is used herein in its ordinary and well accepted sense, and thus refers to any cement which, when made into a paste with water, sets and hardens as a result of chemical reactions between the water and the cement. Portland cement is the most familiar example of a hydraulic cement and is the preferred material for use in the cement compositions of the present invention. Other hydraulic cements include aluminous, oil well, slag, pozzolanic and silicate cements, as well as gypsum and magnesium oxychloride based materials, and mixtures thereof. These cements are well known in the art and are conventionally manufactured by calcining a mixture of limestone and clay to form a clinker, and then grinding the clinker to a fine powder. The cement compositions of the invention include concrete compositions comprising hydraulic cement, water, sand and coarse aggregate; cement pastes, comprising hydraulic cement and water, and mortars, comprising hydraulic cement, sand and water.

Chemical additives to the alkali or alkaline earth metal nitrites that we have found to provide the cathodic type inhibition include organic acids of high molecular weight, such as $C_{17}$ to $C_{21}$ acids generally known as fatty acids (including oleic, stearic, capric, caprylic and palmitic acids as well as salts and esters of these fatty acids such as calcium stearate, butyl ester and butyl stearate); zinc salts, preferably zinc nitrite and zinc nitrate (hexahydrate); iron and zinc phosphates; and mixtures thereof.

The amount of alkali or alkaline earth metal nitrite present in the cement compositions of the present invention will vary according to the requirements of the application, such as the corrosion resistance requirements. Generally, the amount of such nitrite is at least about 0.5% of the dry weight of cement in the composition, preferably from about 1.0% to about 5.0%, more preferably from about 2.0% to about 4.0%.

The cathodic inhibitor component is present in the compositions of the invention in a ratio to the alkali or alkaline earth metal nitrite component of at least 0.01:1, preferably between 0.3:1 to 0.6:1. Suitable amounts of zinc and iron salts are a maximum of about 5.0%, preferably about 1.0 to 3.0%, more preferably about 2.0% by weight s/s calcium nitrite. A suitable ratio of calcium stearate to alkali or alkaline earth metal nitrite is from 0.3:1 to 0.6:1.

It is generally advantageous to add both the nitrite and the cathodic type inhibitor together in the form of a single additive, and as an aqueous solution. However, if desired, the two components could be added to the composition separately. The cement composition may be in a dry powder form or mixed with water to form a plastic mix. It is preferred to add the additives of the invention to the cement in connection with preparation of an aqueous cement slurry, i.e. with the mix water or as additives to the already formed slurry composition.

Other components may be added to the compositions of the present invention in the manner and amounts well known to those skilled in the art, as long as such addition is not detrimental to the advantageous properties of our invention. Such components may include, for example, water reducing agents, air entraining agents, air detraining agents, pozzolanic materials and retarders.

The following examples are given for illustrative purposes only and are not meant to be of limiting effect. The term "DCI" (trademark of W. R. Grace & Co.-Conn.) used herein refers to a 30% (by weight) aqueous solution of calcium nitrite.

EXAMPLE 1

Figure 2:
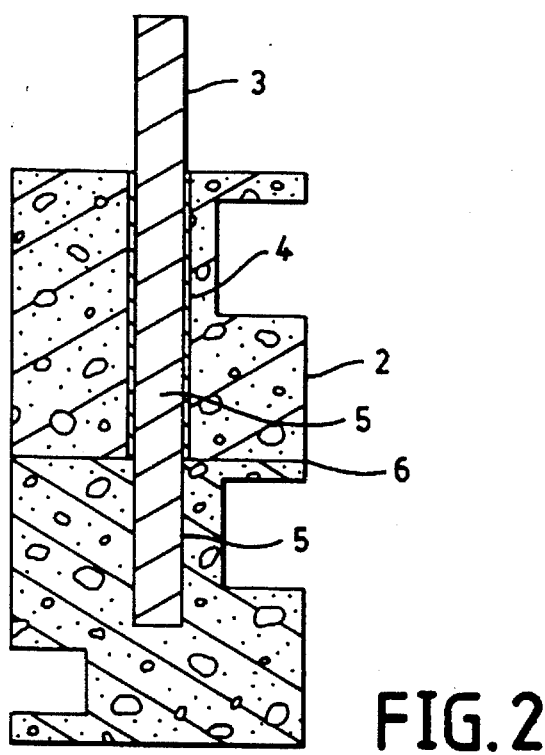
FIG. 2 is a cross-sectional view of the concrete 'lollipop' illustrated in FIG. 1.

Concrete "lollipops" (3"×6" specimens) with 3.5" No. 3 rebar embedded therein were prepared from concrete cylinders as shown in FIGS. 1 and 2. FIG. 1 shows lollipop 1 comprising concrete 2 and #3 rebar 3. FIG. 2 shows the lollipop in cross-sectional view where rebar 3 is shown substantially embedded in the concrete. A portion 4 of rebar 3 is taped to prevent rebar contact with concrete 2, and the remaining portion 5 of rebar 3 is left untaped. Line 6 indicates the level at which lollipop 1 is immersed in water for testing. Zinc nitrite was added in dosages of up to 5% (s/s) on the calcium nitrite (i.e., up to 0.05:1 $Zn(NO_2)_2$ to $Ca(NO_2)_2$) to the concrete containing 5.4 gal of a 30% solution of calcium nitrite/yd$^3$ concrete, and the lollipops were continuously immersed to half their height (3") in a 3% solution of sodium chloride at room temperature for four years. These lollipops simulate concrete piles in a splash/tidal zone. The control was prepared identically, but contained no zinc nitrite.

The corrosion rate was determined using the polarization resistance technique. This entails changing the potential of the specimen from 20 mV below the corrosion potential to 20 mV above the corrosion potential and measuring the resulting current (scan rate of 0.1 mV/s). The slope of the potential vs. current diagram is the polarization resistance ($R_p$). Corrosion rate ($1/R_p$) is expressed in $\mu S/cm^2$ (wherein S represents unit Siemens). Total corrosion (TC) is obtained when the corrosion rate is integrated over a period of time, and is expressed in $\mu S/cm^2$* months. The data are tabulated in Table 1. The results demonstrate that zinc nitrite improved the corrosion rate over that of the 30% solution of calcium nitrite alone.

EXAMPLE 2

Cyclic polarization tests were performed to evaluate the performance of corrosion inhibitors in conditions promoting pitting in environments that simulate those found in concrete pore water. The tests were carried out in saturated calcium hydroxide solutions containing chloride ions. A metal sample (steel cylinder 9 mm diameter and 13 mm long) was immersed in a saturated calcium hydroxide solution containing chloride ions and anodically polarized from −800 mV vs. SCE at a scan rate of 5 mV/s until the current reached 255 µA/cm$^2$ at which point the direction of the scan was reversed. The scan ended at −700 mV vs. SCE. The resulting current was measured throughout the scan.

The results are shown in Tables 2–4. Two important data points are tabulated:

$E_p$–pitting or protection potential: potential below, which pitting cannot occur I–current density at −700 mV v. SCE The more negative the value of $E_p$, the less effective the anodic corrosion inhibitor. The magnitude of the current density I at −700 mV v SCE gives an indication of possible cathodic inhibition.

As can be seen in Table 2, solutions with calcium stearate to calcium nitrite ratios of from about 0.7:1 to 1.3:1, at a $Ca(NO_2)_2$ dosage of 25.1 g/l (approximately equivalent to 1.5 gal of a 30% solution of $Ca(NO_2)2/yd^3$ concrete), considerably reduce the cathodic current. Surprisingly, however, the addition of calcium stearate to such $Ca(NO_2)_2$-containing cement does not practically affect the anodic corrosion inhibition as might be expected. However, at even higher dosages of calcium nitrite, e.g., 43.7 g/l (approximately equivalent to 4.0 gal of a 30% solution of $Ca(NO_2)_2$/yd$^3$ concrete), the addition of calcium stearate in ratios of from about 0.4:1 to 0.8:1, provides further reduction of the cathodic current and also an unexpected improvement of the pitting potential, as can be seen from Table 3. This improvement is even more surprising in view of the highly negative $E_p$ values obtained by addition of calcium stearate alone. Such data would suggest that addition of calcium stearate would increase anodic corrosion, rather than inhibit it. It can therefore be seen from Table 3 that not only does the admixture of the invention provide cathodic corrosion inhibition, but the anodic corrosion-inhibiting action of the $Ca(NO_2)_2$ is surprisingly enhanced by the presence of the cathodic corrosion inhibitor in the admixture; thus an important benefit is provided by the invention.

TABLE 1

Total Corrosion of Lollipops
$\mu S/cm^2$ * months†

| Years | Reference | 5.4 gal/yd$^3$ DCI | 5.4 gal/yd$^3$ DCI + $Zn(NO_2)_2$ |
| --- | --- | --- | --- |
| 2.2 | 38 | 49 | 16 |
| 3.3 | 76 | 84 | 33 |
| 4.0 | 96 | 99 | 47 |
| 4.9 | 130 | 136 | 82 |
| 6.0 | 208 | 186 | 149 |

†Average of 3 values.

TABLE 2

Cyclic Polarization Data
Saturated calcium hydroxide

| | $E_p$ (mV vs. SCE) | I(µA/cm$^2$) −700 mV v. SCE |
| --- | --- | --- |
| 1. 0.25M NaCl | −513 | 40 |
| 2. (1) + 25.1 g/l $Ca(NO_2)_2$ | −136 | 55 |
| 3. (2) + 16.7 g/l calcium stearate | −196 | 33 |
| 4. (2) + 33.5 g/l calcium stearate | −199 | 28 |

TABLE 3

Cyclic Polarization Data
Saturated calcium hydroxide

| | | $E_p$ (mV vs. SCE) | $I(\mu A/cm^2)$ −700 mV v. SCE |
|---|---|---|---|
| 1. | 0.5M NaCl | −464 | 39.8 |
| 2. | (1) + 43.7 g/l Ca(NO$_2$)$_2$ | −161 | 88.2 |
| 3. | (2) + 16.7g/l calcium stearate | −127 | 22.7 |
| 4. | (2) + 33.5 g/l calcium stearate | −112 | 19.6 |
| 5. | (1) + 16.7 g/l calcium stearate | −581 | 32.2 |
| 6. | (1) + 33.5 g/l calcium stearate | −544 | 10.6 |

What is claimed is:

1. A cementitious composition comprising:
   a. hydraulic cement;
   b. an alkali or alkaline earth metal nitrite in an amount of at least about 0.5% of the dry weight of said hydraulic cement in said composition; and
   c. a cathodic corrosion inhibitor selected from the group consisting of $C_{17}$ to $C_{21}$ organic acids, and salts and esters thereof; zinc salts; iron phosphate; and mixtures thereof,
   wherein said cathodic corrosion inhibitor and said alkali or alkaline earth metal nitrite are in a ratio of at least 0.01:1.

2. The composition of claim 1 wherein said hydraulic cement is Portland cement.

3. The composition of claim 1 wherein said alkali or alkaline earth metal nitrite is calcium nitrite.

4. The composition of claim 1 wherein said $C_{17}$ to $C_{21}$ organic acid is selected from the group consisting of oleic, stearic, capric, caprylic and palmitic acid.

5. The composition of claim 1 wherein said cathodic corrosion inhibitor and said alkali or alkaline earth metal nitrite are in a ratio of from about 0.3:1 to 0.6:1.

6. The composition of claim 1 wherein said cathodic corrosion inhibitor is a $C_{17}$ to $C_{21}$ organic acid, salt or ester thereof.

7. The composition of claim 1 wherein said cathodic corrosion inhibitor is calcium stearate or an ester thereof.

8. The composition of claim 1 wherein said zinc salt is selected from the group consisting of zinc nitrite, zinc nitrate (hexahydrate), and zinc phosphate.

* * * * *